United States Patent
Burtin

[15] 3,696,501
[45] Oct. 10, 1972

[54] RIVET BUCKING ASSEMBLY AND METHOD

[72] Inventor: James D. Burtin, Lebanon, Mo.

[73] Assignee: Detroit Tool and Engineering Company, Lebanon, Mo.

[22] Filed: Oct. 24, 1969

[21] Appl. No.: 869,213

[52] U.S. Cl. ................29/509, 72/465, 29/522, 29/243.52, 227/61
[51] Int. Cl. ....................B21d 39/00, B23p 11/00
[58] Field of Search ........29/509, 509 R, 522 R, 522, 29/243.53; 227/61, 62; 72/457, 465

[56] References Cited

UNITED STATES PATENTS

| 1,480,464 | 1/1924 | Pungs | 72/465 |
| 1,850,671 | 3/1932 | Havener | 227/61 |
| 2,216,403 | 10/1940 | Oeckl et al. | 227/61 X |
| 2,396,413 | 3/1946 | Egger | 72/465 |
| 2,396,649 | 3/1946 | Haberstump | 72/465 |
| 2,630,030 | 3/1953 | Gann | 72/465 X |
| 3,373,594 | 3/1968 | Lane | 72/465 X |
| 3,478,567 | 11/1969 | Galutia | 227/61 X |

FOREIGN PATENTS OR APPLICATIONS

| 432,704 | 7/1935 | Great Britain | 72/465 |

*Primary Examiner*—Charlie T. Moon
*Attorney*—Cohn and Powell

[57] ABSTRACT

This rivet bucking assembly is used in a system employing a reciprocating rivet gun. The assembly includes a support housing containing a pneumatic bladder receiving air at a controlled, variable pressure. An anvil member, mounted in slidable relation within an aperture communicating with the interior of the housing receives thrust from the bladder. Air pressure delivered to the bladder is transferred to the anvil to provide the rivet with a support of varying rigidity capable of sustaining impact from the rivet gun for the formation of a well defined rivet head.

6 Claims, 5 Drawing Figures

Inventor
JAMES D. BURTIN
By Cohn and Powell
Attorneys

RIVET BUCKING ASSEMBLY AND METHOD

BACKGROUND OF THE INVENTION

This invention relates in general to a rivet system for fastening individual parts together, and in particular to a rivet bucking assembly suitable for operation in conjunction with a rivet gun.

Riveting procedures may be roughly divided into two classes, both of which involve the formation of a second head on a rivet already provided with one head after the rivet has been positioned through the parts which are to be riveted together. In the first, the impact necessary to form a second rivet head is delivered to the rivet by means of a reciprocating rivet gun. In the second, a non-reciprocating thrust is delivered to the rivet by a machine, usually hydraulically operated, which incorporates a large horseshoe-shaped yoke. The yoke is designed to have sufficient strength to permit the rivet to be squeezed between the arms thereof.

Riveting performed by means of a pneumatic rivet gun is typically a two-man operation. One man holds a bucking tool against the existing rivet head at one end of the rivet and the other applies a driving force to the other end of the rivet sufficient to upset the shank material and form a second head on the rivet. In this procedure, the bucking tool is sometimes merely jammed against the existing head of the rivet while rapid blows are delivered to the shank projecting from the workpiece. In some instances, the bucking device is itself reciprocating, being provided by a second gun which applies counter-blows to the existing rivet head.

Yoke riveting machines are usually large and very cumbersome. They lack the portable advantage of the typical pneumatic rivet gun, although they have an advantage in that it is not essential that two men be used in the operation. Usually, such riveting machines are employed for assembly line work on plate girders and the like. They are limited because of their size and configuration to the riveting of relatively simple, uncomplicated structural shapes where access presents no problem. Yoke riveters are frequently mounted on stands and, when such is the case, the resulting loss of mobility restricts their versatility considerably. The requirement of a two-man team for the operation of pneumatic rivet guns is a serious disability because of the increased labor costs. Further, the pneumatic riveter is not particularly suitable for adaptation to assembly line procedures, because, in general, the quality of the riveting is not as high as that achieved with machine riveters at least in the prior art.

SUMMARY OF THE INVENTION

The bucking assembly is adaptable to both field and shop use and requires the employment of only a single operator.

Because a reciprocating rivet gun rather than a yoke riveter is utilized, the system is extremely mobile and versatile. It is not restricted to the connection of simple structural shapes and may be utilized where access by a yoke riveter would be impossible.

A control lever may be mounted on the gun for actuation by the individual operator. By providing low pressure and high pressure air in sequence to the pneumatic bladder, the riveting process may be accomplished in two stages in which the rivet is initially provided with a yieldable support for the formation of an incipient head and later provided with a rigid support for the completion of a well-defined rivet head.

The bucking assembly includes a support, such as a housing and an anvil member mounted in movable relation to the support. Resilient means such as a pneumatic bladder is disposed between the anvil member and the support member, which delivers a controlled thrust to the anvil member.

A workpiece is supported in selectively spaced adjacent relation to the anvil. When a pneumatic bladder is used as the resilient means, the control means is capable of regulating the delivery of air at a selected pressure to the bladder whereby the anvil member is urged into a first condition in which the bladder provides a yieldable support for the anvil member, and a second condition in which the bladder provides a substantially rigid support for the anvil member.

The control means includes a low pressure regulator and a high pressure regulator for delivering air at a selected pressure to the bladder. The support, when formed into a housing, includes a substantially U-shaped portion and an anvil adaptor portion or closure plate extending between the arms thereof. The bladder is at least partially contained within the housing whereby to facilitate the exertion of pressure against the anvil member.

The anvil member projects from the housing and includes a die at the outer end and a shoulder at the inner end. The housing includes a retaining abutment engageable by the shoulder to limit outward movement of the anvil member relative to the housing.

A pin having an enlarged head portion provides the anvil member, and said head portion includes a pressure surface in contact with the pneumatic bladder to deliver increased thrust to the pin. The underside of the head portion provides the shoulder cooperating with the abutment provided by the closure plate of the housing.

The method of forming the rivet head is accomplished by the steps of disposing a pneumatic bladder between a workpiece and a support; disposing an anvil between the workpiece and the bladder; positioning a rivet in the workpiece; supplying air at a selected pressure to the bladder to supply thrust to the anvil; and applying a reciprocating force to the rivet to urge the rivet against the anvil to form a rivet head.

DESCRIPTION OF THE PREFERRED EMBODIMENT

Figure 1:
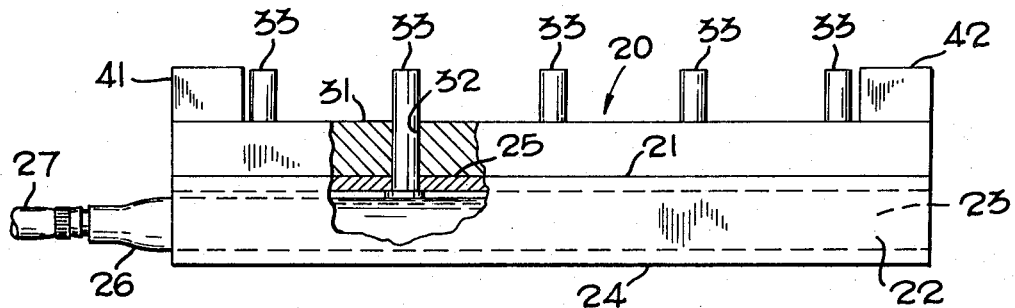
FIG. 1 is an elevational view of the bucking assembly partly in cross section.
Figure 4:
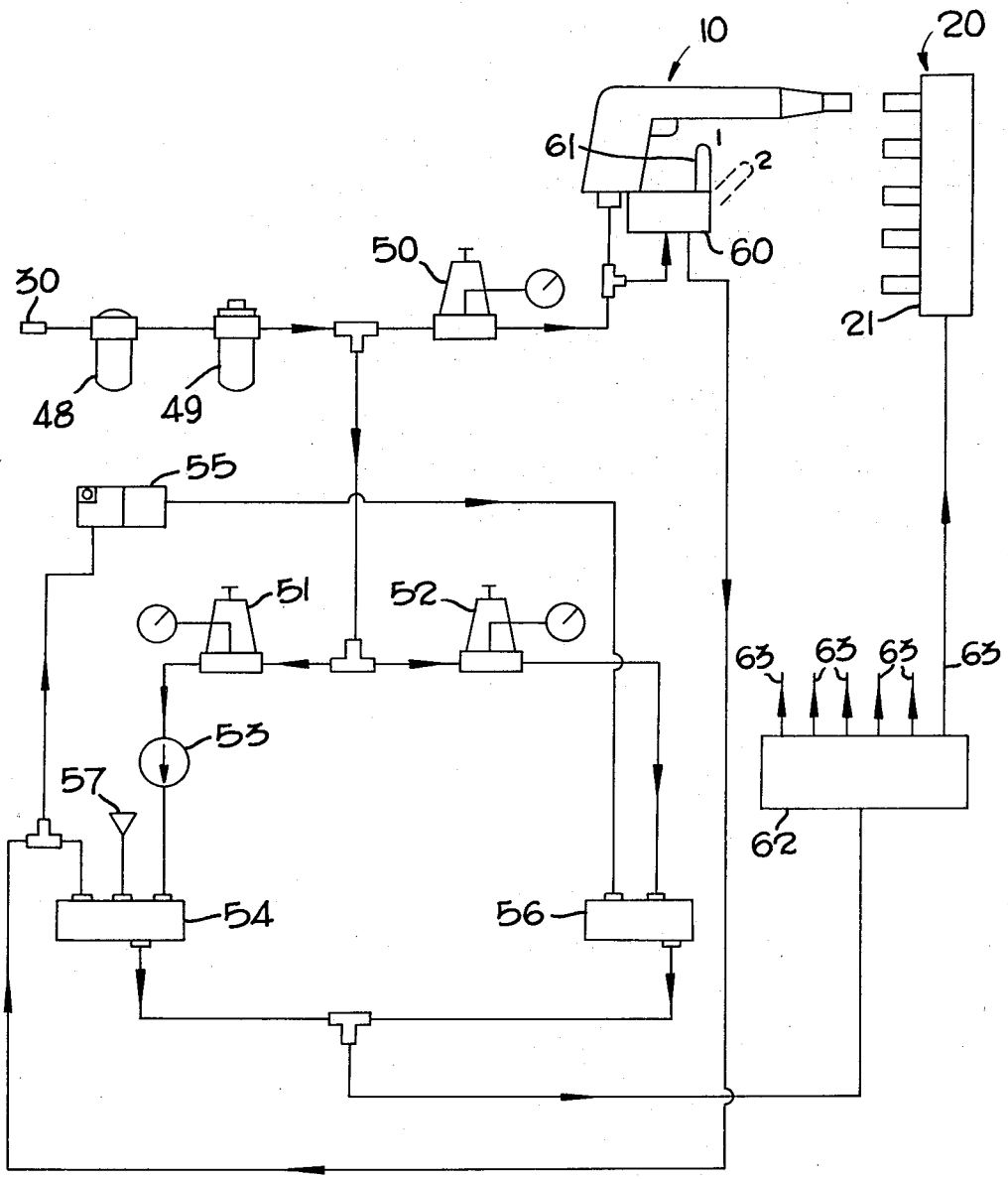
FIG. 4 is a schematic arrangement of the regulation system.

Referring now by characters of reference to the drawing and first to FIGS. 1 and 4, it will be understood that the rivet system includes as its principal element, a reciprocating pneumatic hammer 10 and a rivet bucking assembly 20.

The bucking assembly 20 includes an elongate housing 21, substantially in the form of a box open at both ends and including side walls 22 and 23 and bottom wall 24. The side walls 22 and 23 and the bottom wall 24 provide three sides of the housing and an upper wall 25 extends between the side walls 22 and 23 to provide a closure.

Disposed in the interior of the housing 21 is a pneumatic bladder 26. In the preferred embodiment, the bladder 26 is formed from a portion of a hose, the hose being closed at its remote end. Air is supplied to the bladder 26 from an air line 27, which is connected by way of a regulation system to an air supply 30 (FIG. 4). The regulation system will be described later.

A guide block 31 is attached, as by welding, to the upper wall 25 of the housing 21 as is shown in FIG. 1. The guide block 31 and the upper wall 25 include a plurality of apertures 32 communicating with the interior of the housing 21 and a pin 33, constituting an anvil member, is slidable received within each aperture 32. Each pin 33 includes a body portion 34 and a head portion 35, and the underside 36 of the head portion 35 constitutes a shoulder which engages with the margin 37 of the aperture 32 in the upper wall 25. The margin 37 constitutes an abutment engageable by the underside of the head portion 35 to limit upward movement of the pin 33 relative to the housing 21.

Figure 2:
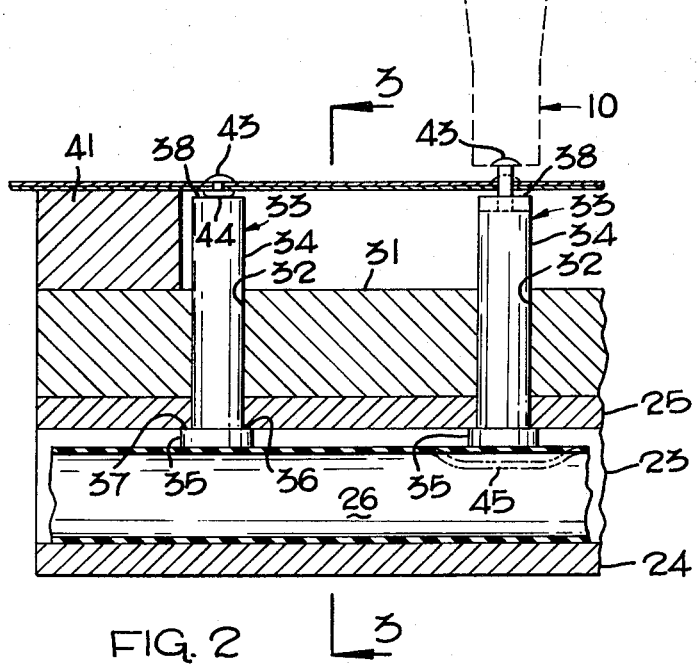
FIG. 2 is an enlarged, fragmentary elevational view illustrating relative locations of the anvil and workpiece.
Figure 3:
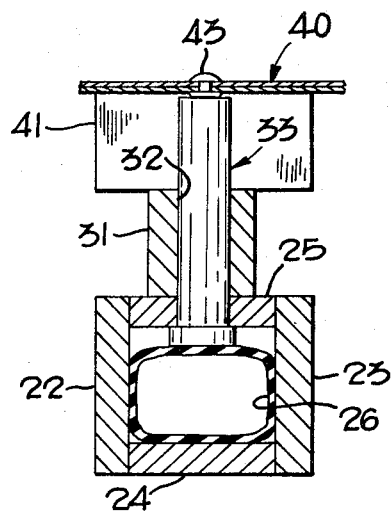
FIG 3 is a cross sectional view taken on line 3—3 of FIG. 2.

As clearly indicated in FIG.2, the pin 33 is supported by the pneumatic bladder 26, and it will be understood that inflation or deflation of the bladder 26 will control movement of the pin relative to the housing 21, particularly when an axial force is exerted on the pin 33, as by rivet gun 10, tending to push said pin into the housing 21. The degree to which the bladder 26 is pressurized provides the pin 33 with a greater or lesser degree of resilience and the bladder 26, disposed below the pin, thereby constitutes a resilient means.

It is necessary, as will appear, that the workpiece 40 be disposed outwardly beyond the extended pin 33. In the example provided, the workpiece 40 consists of two plates which are to be riveted together. To support the workpiece 40, spacer blocks 41 and 42 are provided at opposite ends of the housing 21. These blocks are carried by the guide block 31 and provide the spacing function. The workpiece 40 is carried in extended relation between spacer blocks 41 and 42 in the manner of a simply supported beam, and clamps (not shown) secure the workpiece 40 to the blocks 41 and 42 a selected distance outwardly beyond the extended pin 33. This distance is so chosen as to be sufficient to permit the formation of a second flat head 44 on the rivet 43. Obviously, a button-shaped head could be provided as an alternative to the flat head, by providing a die at the remote end 39 of the pin 33, having a suitable cavity configuration to form such a head. In this event, the lowest portion of the die cavity would be spaced from the upper face of the spacer blocks 41 and 42 a distance corresponding to the set of the button head required and the remote end 38 of the pin 33 which would be in substantial contact with the underside of the workpiece 40.

It will be understood that the bladder 26 is substantially contained within the housing 21 and that this restriction facilitates and assures the transfer of bladder pressure in the form of thrust delivered to the pins 33. Obviously, the greater the contact area of the heads 35, the greater the thrust.

It is thought that the structural features of this rivet bucking assembly have become apparent from the foregoing description of parts, but for completeness of disclosure, the operation of the rivet system as a whole will be briefly described.

It has been observed that a superior riveted joint results when the rivet is backed up initially by a relatively yieldable support during the formation of an incipient head and then shortly thereafter, by a relatively rigid support in the final stages of the heading operation. This desirable feature is attained with the bucking assembly used in this rivet system by providing a regulating or control system capable of delivering low and high pressure air to the pneumatic bladder 26 in sequence.

Referring to FIG. 2, a rivet 43 is shown in broken outline in its initial position with the shank depending below the workpiece 40. The head 35 and remote face 38 of the pin 33 are also shown in broken outline. By supplying air at a relatively low pressure to the bladder 26, the rivet 43 is urged or tends to be urged outwardly by the anvil pin 33 which, in a first condition, is urged into thrust contact with the pneumatic hammer 10. Reciprocating counterthrust from the hammer initiates and expedites the formation of an incipient head. By supplying air at a higher pressure to the bladder 26 while the reciprocating counterthrust continues, the yieldable support provided by the cushioning bladder 26 becomes much more rigid and the pin is urged into a second condition which permits the final forming of a well defined head, such as that indicated by numeral 44 on the left-hand rivet shown in FIG. 2. During the low pressure stage, the bladder 26 will yield as indicated in broken outline by numeral 45 in response to impact from the pneumatic hammer. During the high pressure stage, on the other hand, the bladder 26 will be substantially rigid.

FIG. 4 illustrates in schematic form a pneumatic system capable of achieving the above results. The system preferably includes a manifold 62 having a plurality of outlets 63, each leading to a bucking assembly such as that indicated by numeral 20. Air from a reservoir supply (not shown) is introduced into the system through an inlet port 30. After passing through filter and oiler stages 48 and 49 respectively, the air flows through a gun pressure regulator 50 which is set to the pressure required by the rivet gun 10. This pressure is of the order of 80 p.s.i. and is indicated by the gauge connected to the regulator 50.

Incoming air pressure also flows through a low pressure regulator 51 set to 30 p.s.i. and a high pressure regulator 52 set to 60 p.s.i. The low pressure regulator 51 is connected to a three-way valve 54 by way of a check valve 53 and the high pressure regulator 52 is connected to a two-way valve 56.

Air pressure to the rivet gun 10 is partially diverted to a small three-way control valve 60 on the rivet gun 10 and the system operates in the following manner. When the control valve 60 is actuated by moving the control lever 61 to position 2, air flows to the three-way valve 54 which is thereby actuated to permit low pressure air to flow from the low pressure regulator 51 through the three-way valve 54 to the bucking assembly housing 21 containing the bladder 26. It will be understood that the housing 21 is one of the stations connected to the manifold 62 by way of an outlet 63. Thus, the bladder 26 contains low pressure air sufficient for the formation of an incipient head on the rivet 43 by application of reciprocating thrust from the rivet gun 10.

When the control lever 61 is moved to position 2, air pressure also flows from the control valve 60 to an adjustable, delayed-time valve 55. After a predetermined delay during which time, of course, the incipient head is being formed, air flows through the time valve 55 to the two-way valve 56, thereby actuating the two-way valve 56 to permit higher pressure air to flow from the high pressure regulator 52 through the two-way valve 56 and to the housing 21 containing the bladder 26. The delivery of high pressure air to the bladder 26 causes the bladder to become sufficiently rigid to provide a relatively solid base for the pin 33 and permit the final heading operation of the rivet.

When the control valve 60 is released, by returning the control lever to position 1, the three-way valve 54 is de-actuated and high pressure in the bladder 26 is exhausted through the three-way valve 54 to the exhaust outlet 57. One cycle of operation is thus completed and a rivet head formed in a matter of seconds. Another cycle commences when the control lever 61 is again turned to position 2.

Figure 5:
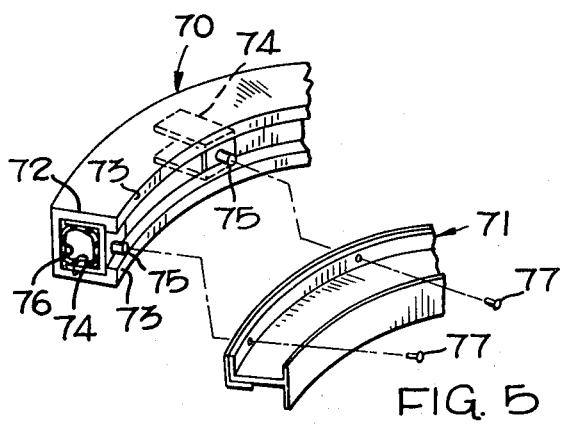
FIG. 5 illustrates a modified bucking assembly suitable for riveting curved members.

FIG. 5 illustrates a modified bucking assembly 70 which finds particular use in riveting a curved workpiece, such as that indicated by numeral 71. In this modified bucking assembly, the housing 72 includes a substantially U-shaped portion having inwardly turned lips 73. These lips provide the function performed by the spacer blocks 41 and 42 in the embodiment previously described, and also act to retain the U-shaped yoke members 74 which provide housing closure portions. Pins 75 are slidably received within the yokes 74 and include a head (not shown) corresponding to that provided on pin 33. In the situation where the rivets 77 are to have flat second heads formed on the shank, the outward projection of the pins 75 from the upper face of the yokes 74 is less than the thickness of the lips 73 by substantially the required thickness of the flat head.

It will be observed that, in effect, the yokes 74 provide an intermittent upper wall for the housing 72 in contrast to the preferably continuous upper wall 25 of the prior embodiment. In its operative condition, the workpiece 71 is seated on the lips 73. Air is supplied to the bladder 26 by a control system as described above and the general operation is substantially similar.

As a variation in the modified assembly, the pin could be welded or otherwise secured to the yoke 74. In this case, the yoke and pin combination would provide an anvil member and the lips 73 would, of course, provide a means of retaining this combination anvil member within the housing 72.

I claim as my invention:

1. A rivet bucking assembly for providing back-up support for a reciprocating rivet gun operating to rivet a workpiece, the assembly comprising:
    a. a support member,
    b. an anvil member mounted in movable relation to the support member,
    c. gas inflatable resilient means transversely disposed between the anvil member and the support member and exerting a thrust on the anvil member,
    d. means supporting the workpiece,
    e. control means selectively controlling the thrust of the inflatable resilient means to urge the anvil member outwardly of the support, and
    f. the control means regulating the supply of gas to the inflatable resilient means to urge the anvil member to a first condition providing low pressure back-up to the rivet for the formation of an incipient head and a second condition providing high pressure back-up for the formation of a complete head.

2. A rivet bucking assembly as defined in claim 1, in which:
    g. the inflatable resilient means includes a pneumatic bladder,
    h. an air supply is connected to the bladder, and
    i. the control means regulates the supply of air to the bladder,
    j. the control means including a low pressure regulator, a time delay means and a high pressure regulator adjusting the supply of air to the bladder and urging the anvil member sequentially into a first condition having a duration predetermined by the time delay means, the bladder providing a low pressure back-up to the rivet for the formation of an incipient head, and a second condition, the bladder providing high pressure back-up for the formation of a complete head.

3. A rivet bucking assembly as defined in claim 1, in which:
    g. a pin, alignable with the rivet during forming, and including a shank portion and a head portion, provides the anvil member, and
    h. the support member includes a housing for the inflatable resilient means, the housing including an aperture mounting the shank of the pin in outwardly projecting movable relation, and the housing including an abutment engageable with the head portion to limit outward movement of the shank under thrust from the inflatable resilient means.

4. A riveting system for riveting a workpiece comprising:
    a. an air supply,
    b. a pneumatic reciprocating rivet gun connected to the air supply, and
    c. a bucking assembly including:
    c. a bucking assembly including:
        2. a plurality of individually movable anvil pin members mounted in movable relation to the support housing,
        3. a pneumatic bladder disposed in the housing and selectively supporting the pin members individually,
        5. control means selectively regulating the pressure in the pneumatic bladder to urge the pin members outwardly from the support housing, the pin members providing back-up for rivet deformation by the reciprocating gun, and
    d. the control means regulating air pressure in the bladder for urging the pin members to a first condition providing low pressure back-up to the rivet for the formation of an incipient head, and a second condition providing high pressure back-up for the formation of a complete head.

5. A riveting system for riveting a workpiece comprising:
   a. an air supply,
   b. a pneumatic reciprocating rivet gun connected to the air supply, and
   c. a bucking assembly including:
      1. a support housing,
      2. an anvil member mounted in movable relation to the support housing,
      3. a pneumatic bladder disposed in the housing and selectively supporting the anvil member,
      4. means supporting the workpiece in selected spaced relation from the anvil member, and
      5. control means selectively regulating the pressure in the pneumatic bladder to urge the anvil member outwardly from the support housing, the anvil member providing back-up for rivet deformation by the reciprocating gun,
   d. the support housing including a U-shaped portion and a closure portion extending between the arms thereof,
   e. the closure portion including an aperture receiving the anvil member in slidable relation,
   f. the anvil member including a body portion projecting outwardly of the closure portion and a head portion engaging the closure portion to limit outward movement of the anvil member relative to the closure portion,
   g. the support housing including spacer means projecting beyond the remote end of the anvil and seating the workpiece, and
   h. the rivet head being formed in the space between the remote end of the anvil member and the outer portion of the spacer.

6. A method of riveting a workpiece comprising the steps of:
   a. supporting the workpiece in fixed relation to a support,
   b. disposing a pneumatic bladder between the workpiece and the support,
   c. disposing an anvil between the pneumatic bladder and the rivet,
   d. positioning a rivet in the workpiece,
   e. bringing a reciprocating rivet gun into contact with the rivet,
   f. actuating the rivet gun to urge the rivet reciprocatively against the anvil to deform the rivet into a head, and
   supplying air to the bladder at relatively low pressure during the initial forming of the rivet head and supplying air to the bladder at relatively high pressure during the final forming of the rivet head.

* * * * *